> US010393965B2

(12) United States Patent
Michit et al.

(10) Patent No.: US 10,393,965 B2
(45) Date of Patent: Aug. 27, 2019

(54) PHOTONIC INTERCONNECTION SWITCHES AND NETWORK INTEGRATED IN AN OPTOELECTRONIC CHIP

(71) Applicant: STMICROELECTRONICS (CROLLES 2) SAS, Crolles (FR)

(72) Inventors: Nicolas Michit, Grenoble (FR); Patrick Le Maitre, Biviers (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 0 days.

(21) Appl. No.: 16/148,535

(22) Filed: Oct. 1, 2018

(65) Prior Publication Data

US 2019/0101699 A1    Apr. 4, 2019

(30) Foreign Application Priority Data

Oct. 2, 2017    (FR) .................................... 17 59184

(51) Int. Cl.
*G02B 6/293*    (2006.01)
*H04Q 11/00*    (2006.01)

(52) U.S. Cl.
CPC ......... *G02B 6/29343* (2013.01); *G02B 6/293* (2013.01); *H04Q 11/0005* (2013.01); *H04Q 2011/0007* (2013.01)

(58) Field of Classification Search
CPC ................ G02B 6/29343; G02B 6/293; H04Q 11/0005; H04Q 2011/0007
See application file for complete search history.

(56) References Cited

U.S. PATENT DOCUMENTS

| 5,623,356 A * | 4/1997 | Kaminow .......... H04Q 11/0005 398/46 |
| 6,195,187 B1 * | 2/2001 | Soref ................ G02B 6/12007 398/9 |

(Continued)

FOREIGN PATENT DOCUMENTS

| WO | 2008080122 A2 | 7/2008 |
| WO | 2015168919 A1 | 11/2015 |
| WO | 2016116162 A1 | 7/2016 |

OTHER PUBLICATIONS

Bianco, Andrea et al: "Optical Interconnection Networks Based on Microring Resonators," J. Opt. Commun. Netw./vol. 4, No. 7, Jul. 2012, pp. 546-556.

(Continued)

*Primary Examiner* — Ryan A Lepisto
(74) *Attorney, Agent, or Firm* — Crowe & Dunlevy

(57) ABSTRACT

A photonic interconnection elementary switch is integrated in an optoelectronic chip/The switch includes first and second linear optical waveguides which intersect to form a first intersection. Two first photonic redirect ring resonators are respectively coupled to the first and second optical waveguides. Two second photonic redirect ring resonators are respectively coupled to the first and second optical waveguides. A third linear optical waveguide is coupled to one of the first ring resonators and one of the second ring resonators. A fourth linear optical waveguide is coupled to another of the first resonators and to another of the second ring resonators. A base switch, complex switch, and photonic interconnection network integrated in an optoelectronic chip, include at least two of the photonic interconnection elementary switches.

12 Claims, 13 Drawing Sheets

(56) References Cited

U.S. PATENT DOCUMENTS

| | | | | |
|---|---|---|---|---|
| 8,032,023 B2 * | 10/2011 | Rasras | ............... | G02B 6/12007 |
| | | | | 398/43 |
| 8,693,817 B1 * | 4/2014 | Ng | ..................... | G02B 6/12007 |
| | | | | 385/131 |
| 9,602,431 B2 * | 3/2017 | Lee | ......................... | H04L 49/10 |
| 2013/0259420 A1 | 10/2013 | Yoshida et al. | | |

OTHER PUBLICATIONS

Hu, Ting et al: "Non-Blocking Wavelength-Routed 4×4 Silicon Optical Router for On-Chip Photonics Networks," IEEE, 2012, pp. 104-105.

Shabani, Hesam et al: "Loss aware switch design and non blocking detection algorithm for intra-chip scale photonic interconnection networks," IEEE Transactions on Computers (vol. 65, Issue: 6, Jun. 2016 ).

* cited by examiner

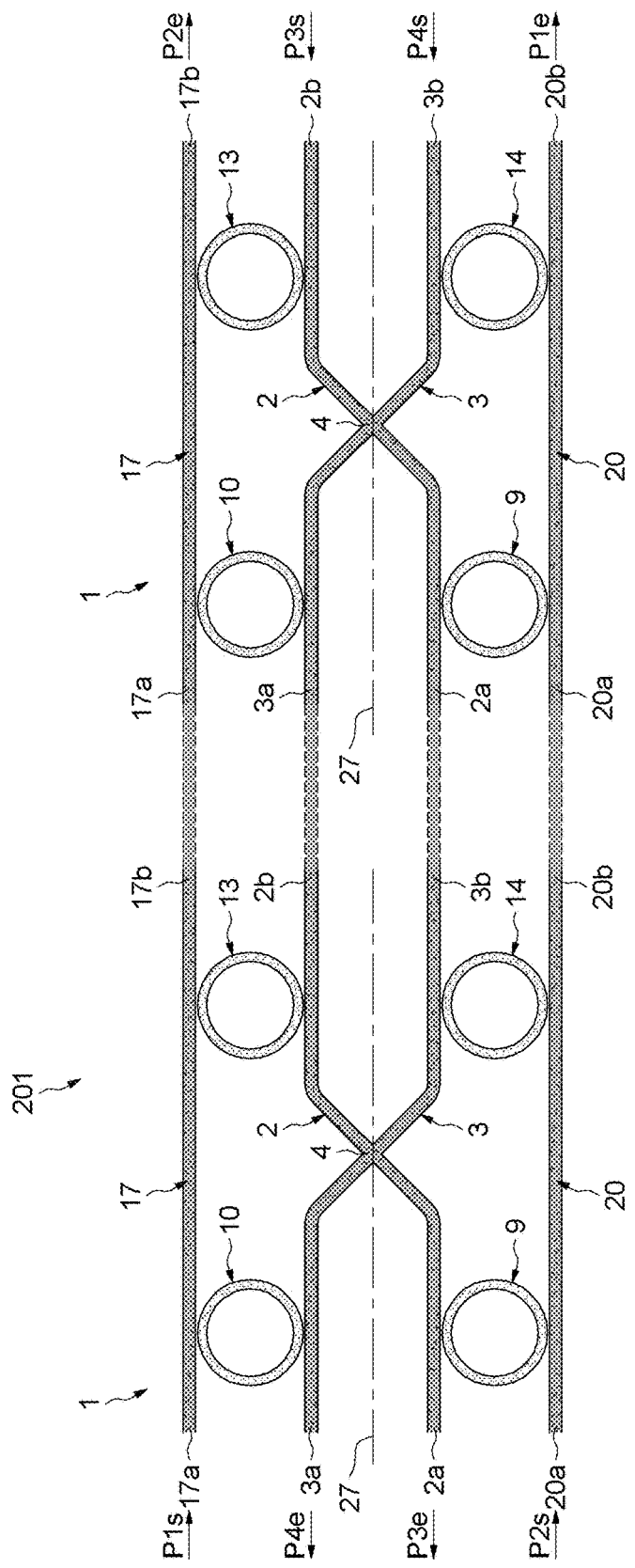

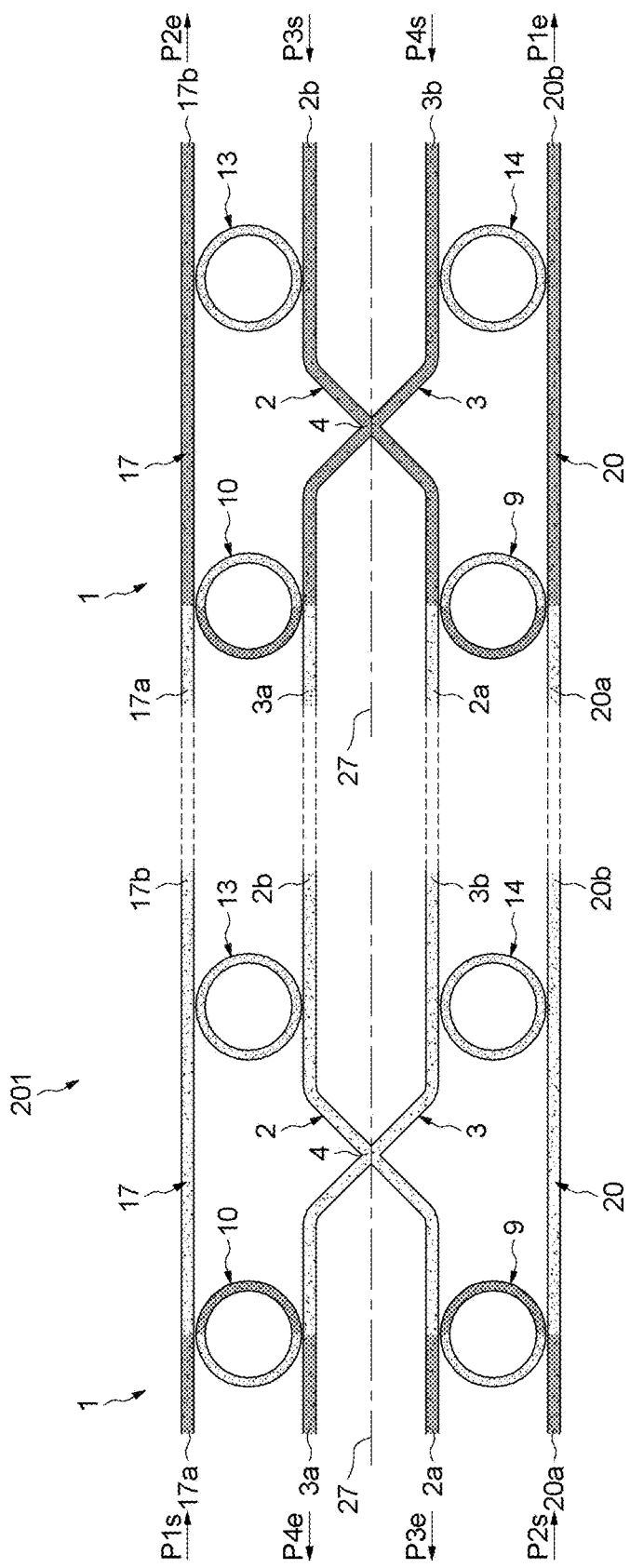

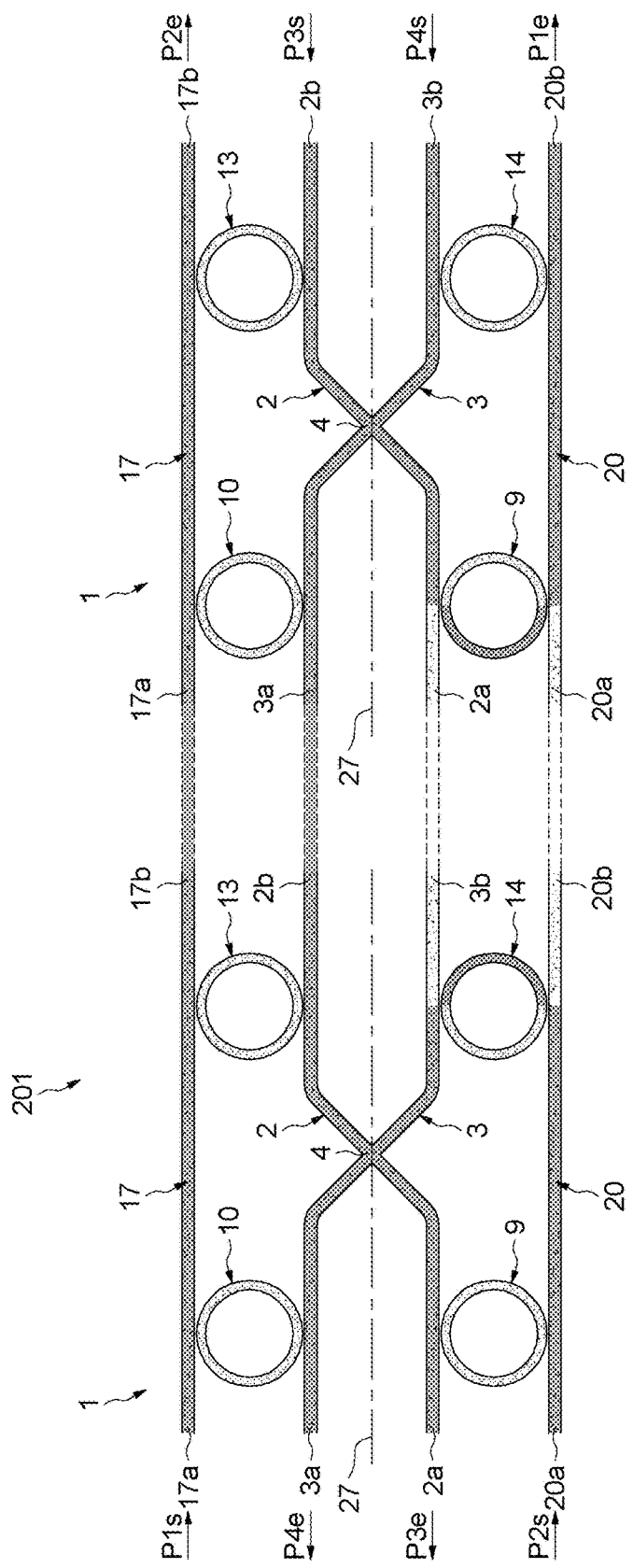

US 10,393,965 B2

PHOTONIC INTERCONNECTION SWITCHES AND NETWORK INTEGRATED IN AN OPTOELECTRONIC CHIP

PRIORITY CLAIM

This application claims the priority benefit of French Application for Patent No. 1759184, filed on Oct. 2, 2017, the content of which is hereby incorporated by reference in its entirety to the maximum extent allowable by law.

TECHNICAL FIELD

According to embodiments, the present invention relates to the field of photonic interconnection switches integrated in optoelectronic chips and photonic interconnection networks integrated in optoelectronic chips and including such switches.

BACKGROUND

It is known to produce linear optical waveguides, integrated in optoelectronic chips and capable of confining and guiding light.

It is also known to produce photonic interconnection switches integrated in optoelectronic chips, making it possible to transfer photons from one optical waveguide to another optical waveguide via a redirect ring resonator, controllable by an electrical signal.

Generally, the resonator comprises an integrated ring and an integrated electronic component adjacent to this ring and controllable by an electrical signal, the integrated ring having portions adjacent to the optical waveguides so as to form areas of optical coupling between the ring and the optical waveguides.

In the absence of an electrical signal, the integrated ring is in a "non-resonant" state such that a light wave, brought to a coupling area by an optical waveguide, passes through this coupling area and continues its path in this optical waveguide.

On the other hand, in the presence of an electrical signal, the integrated electronic component changes the state of the integrated ring which is then placed in a "resonant" state such that a light wave that reaches a coupling area via one of the optical waveguides is transferred to the integrated ring then transferred to the other optical waveguide via the other coupling area, the light wave continuing its path in the other optical waveguide in an opposite direction.

Commonly, the structures described above are produced on silicon and silicon-on-insulator (SOI) substrates.

Furthermore, H. Shabani "Loss aware switch design and non blocking detection algorithm for intra-chip scale photonic interconnection networks", IEEE Transactions on Computers (Volume: 65, Issue: 6, June, 2016) provides complex photonic interconnection networks integrated in optoelectronic chips, which comprise a plurality of optical waveguides and a plurality of switches, as described above, and which include intersections between the optical waveguides, with a view to selectively transferring data and data packets between sources and recipients, by selectively controlling the resonators.

The photonic interconnection networks described above are limited by the losses and crosstalk that degrade the transmitted signals when the optical waves pass through intersections or resonators. They should therefore be kept to the minimum.

SUMMARY

In an embodiment, a photonic interconnection elementary switch integrated in an optoelectronic chip is provided comprises: a first and a second linear optical waveguide, which intersect forming a first intersection and which respectively have first and second external optical coupling ends, so that the first and a second linear waveguide have first branches between said intersection and said first ends and have second branches between said intersection and said second ends; two first photonic redirect ring resonators, respectively comprising a single ring, respectively coupled to the first and second optical waveguides in local optical coupling areas of the first branches, the latter passing between these first resonators, two second photonic redirect ring resonators, respectively comprising a single ring, respectively coupled to the first and second optical waveguides in local optical coupling areas, the latter passing between these second resonators, a third linear optical waveguide coupled to the first and to the second ring resonators, located on a same side with respect to the first branch of the second optical waveguide and the second branch of the first optical waveguide, in local optical coupling areas, and a fourth linear optical waveguide coupled to the first and to the second ring resonator located on a same side with respect to the first branch of the first optical waveguide and the second branch of the second optical waveguide, in local optical coupling areas; the third and fourth optical waveguides having first ends on the side of the first ring resonators and second ends on the side of the second ring resonators.

The third optical waveguide may not intersect any of the other optical waveguides and the fourth optical waveguide may not intersect any of the other optical waveguides.

The first and third optical waveguides may intersect and the second and fourth optical waveguides may intersect, respectively between their second ends and the second ring resonators, forming second and third intersections.

The elementary switch may comprise an axis of symmetry whereon said intersection is located between said first and second waveguides and on each side of which said first and second ring resonators are respectively located.

The first ends of the third and fourth optical waveguides and the second ends of the first and second optical waveguides may form light wave inputs, respectively optical wave outputs, and the first ends of the first and second optical waveguides and the second ends of the third and fourth optical waveguides may form light wave outputs, respectively optical wave inputs.

A photonic interconnection base switch integrated in an optoelectronic chip is also provided, which comprises two elementary switches, in which the waveguides of one are selectively connected to the waveguides of the other.

The resonators of said elementary switches may be capable of resonating at the same frequency.

A photonic interconnection complex switch integrated in an optoelectronic chip is also provided, which comprises an even number of elementary switches, in which the waveguides of the adjacent elementary switches are selectively connected in series and in which the elementary switches are subjected in pairs to different frequencies.

A photonic interconnection complex switch integrated in an optoelectronic chip is also provided, which comprises a plurality of base switches, in which the waveguides of the adjacent elementary switches are selectively connected in series and in which the base switches are subjected to different frequencies.

A photonic interconnection network integrated in an optoelectronic chip is also provided, which comprises optoelectronic devices respectively having optical wave input ports and output ports, which are selectively connected via a base switch or via a complex switch.

BRIEF DESCRIPTION OF THE DRAWINGS

Integrated photonic interconnection switches will now be described by way of embodiments, illustrated by the drawing in which:

FIGS. 6A to 6D represent flow modes of optical waves in the base switch in FIG. 4;

DETAILED DESCRIPTION OF THE DRAWINGS

Figure 1:
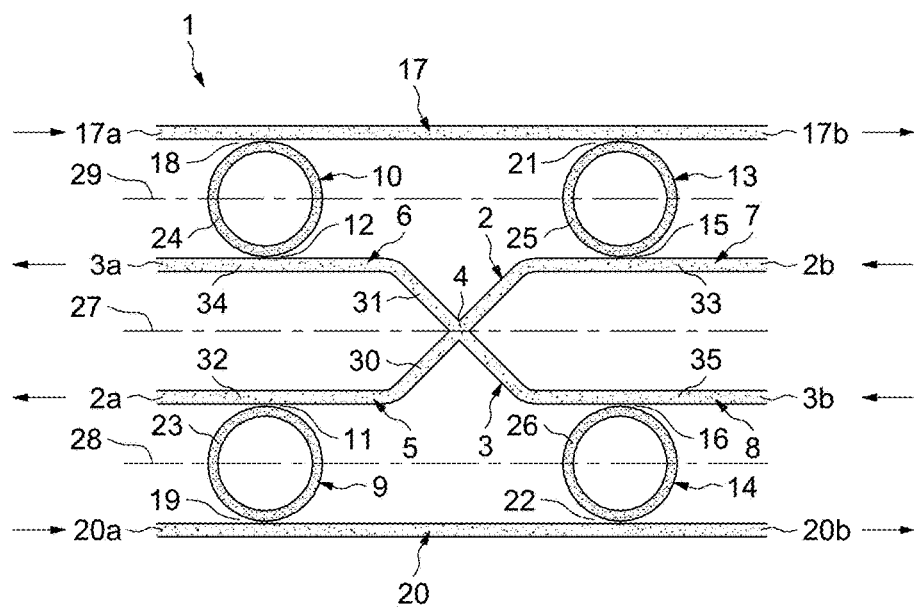
FIG. 1 represents a plan view of an integrated photonic interconnection elementary switch.

FIG. 1 illustrates a photonic interconnection elementary switch 1, integrated in an optoelectronic chip, in which the optical guides which will be described are in the same general plane.

The elementary switch 1 comprises a first and a second linear optical waveguide 2 and 3, which intersect forming an intersection 4 and which respectively have first and second external optical coupling ends 2a, 2b, and 3a, 3b, so that the first and a second linear waveguides 2 and 3 have first branches 5 and 6 between the intersection 4 and the first ends 2a and 3a and have second branches 7 and 8 between the intersection 4 and the second ends 2b and 3b.

The elementary switch 1 comprises two first photonic redirect ring resonators 9 and 10, respectively coupled to the first branches 5 and 6 of the first and second optical waveguides 2 and 3 in local optical coupling areas 11 and 12 of the first branches 5 and 6, these branches 5 and 6 passing between these first resonators 9 and 10.

The elementary switch 1 comprises two second photonic redirect ring resonators 13 and 14 respectively coupled to the second branches 7 and 8 of the first and second optical waveguides 2 and 3 in local optical coupling areas 15 and 16 of the second branches 7 and 8, these branches 7 and 8 passing between these second resonators 13 and 14.

The elementary switch 1 comprises a third linear optical waveguide 17 coupled to the first and to the second ring resonators 10 and 13, located on a same side with respect to the first branch 6 of the second optical waveguide 3 and the second branch 7 of the first optical waveguide 2, in local optical coupling areas 18 and 21.

The elementary switch 1 comprises a fourth linear optical waveguide 20 coupled to the first and to the second ring resonators 9 and 14 located on a same side with respect to the first branch 5 of the first optical waveguide 2 and the second branch 8 of the second optical waveguide 3, in local optical coupling areas 19 and 22.

The third and fourth optical waveguides 17 and 20 have first ends 17a and 20a on the side of the first ring resonators 9 and 10 and second ends 17b and 20b on the side of the second ring resonators 13 and 14.

The ring resonators 9, 10, 13 and 14 respectively comprise single rings 23, 24, 25 and 26 forming optical waveguides. These rings 23, 24, 25 and 26 are adjacent to the aforementioned corresponding waveguides with which they constitute the aforementioned corresponding local optical coupling areas.

The rings 23, 24, 25 and 26 are respectively associated with integrated components (not represented), which, when they are subjected to electrical signals, are capable of changing the state of the ring resonators, 9, 10, 13 and 14.

According to a particular arrangement illustrated in FIG. 1, the elementary switch 1 advantageously has a longitudinal geometric symmetry 27 (from left to the right in FIG. 1) through the intersection 4.

The rings 9 and 10 and the rings 13 and 14 are respectively arranged symmetrically with respect to the longitudinal axis 27.

The centers of the rings 9 and 14 and the centers of the rings 10 and 13 are arranged on lines 28 and 29 parallel to the longitudinal axis 17 and symmetrical with respect to the longitudinal axis 27.

The optical waveguides 2 and 3 are symmetrical with respect to the longitudinal axis 17.

The optical waveguides 17 and 20 are symmetrical with respect to the longitudinal axis 17.

The optical waveguides 2 and 3 comprise rectilinear portions 30 and 31 which intersect forming the intersection 4 and which are oriented at 45° with respect to the axis of symmetry 27 forming a cross.

The optical waveguide 2 comprises a longitudinal portion 32 that connects one end of the portion 30 thereof and the external coupling end 2a thereof and with which the ring 9 is coupled at one place and comprises a longitudinal portion 33 that connects the other end of the portion 30 thereof and the external coupling end 2b thereof and with which the ring 13 is coupled at one place.

The optical waveguide 3 comprises a longitudinal portion 34 that connects one end of the portion 31 thereof and the external coupling end 3a thereof and with which the ring 10 is coupled at one place and comprises a longitudinal portion 35 that connects the other end of the portion 31 thereof and the external coupling end 3b thereof and with which the ring 14 is coupled at one place.

The optical waveguides 17 and 20 extend longitudinally and are symmetrical with respect to the longitudinal axis 17.

The first ends 2a, 3a, 17a and 20a of the optical waveguides 2, 3, 17 and 20 are oriented in a direction of the longitudinal axis 17 (to the left in FIG. 1) and the second ends 2b, 3b, 17b and 20b of the optical waveguides 2, 3, 17 and 20 are oriented in the other direction of the longitudinal axis 17 (to the right in FIG. 1). The first ends 17a and 20a are farther from the longitudinal axis 17 than the first ends 2a and 3a. The second ends 17b and 20b are farther from the longitudinal axis 17 than the second ends 2b and 3b.

Figure 2:
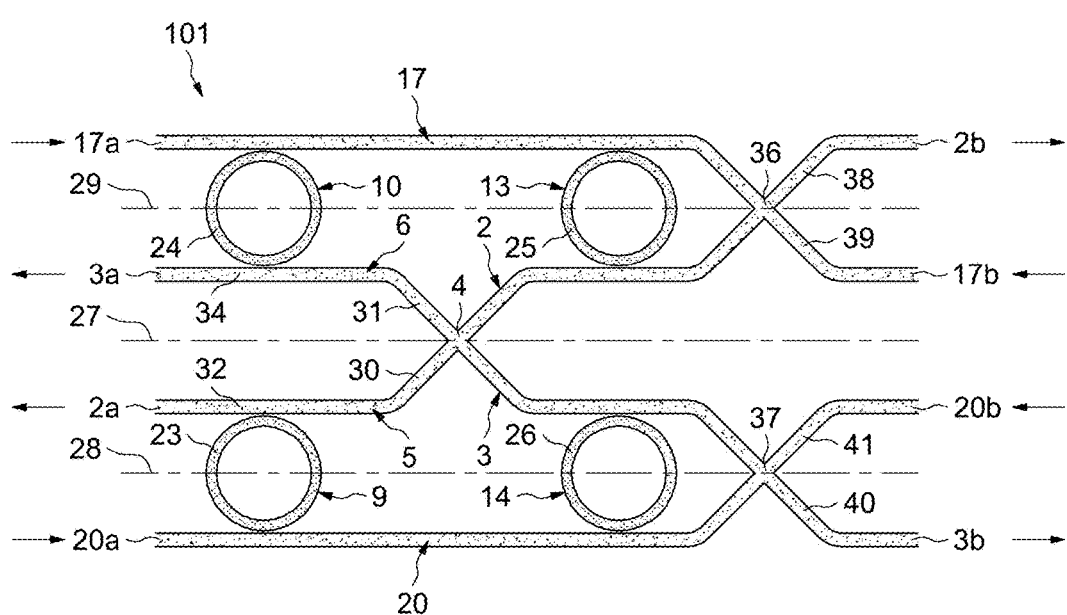
FIG. 2 represents a plan view of another integrated photonic interconnection elementary switch.

According to another configuration illustrated in FIG. 2, an elementary switch 101 differs from the elementary switch 1 in that the parts of the first and third optical waveguides 2 and 17, located between the optical coupling areas 15 and 21 and the second ends 2b and 17b, intersect forming an intersection 36 and in that the parts of the second and fourth optical waveguides 3 and 20, located between the optical coupling areas 16 and 22 and the second ends 3b and 20b intersect forming an intersection 37.

In the particular arrangement described above, the optical waveguides 2 and 17 of this other configuration are modified and have intermediate rectilinear portions 38 and 39 at 45° with respect to the longitudinal axis which intersect forming the intersection 36 and the optical waveguides 3 and 20 are modified and have intermediate sections 40 and 41 at 45° with respect to the longitudinal axis which intersect forming the intersection 37. The intersections 36 and 37 are symmetrical with respect to the longitudinal axis 27 and are respectively on the longitudinal lines 29 and 28.

As previously, the first ends 17a and 20a are farther from the longitudinal axis 17 than the first ends 2a and 3a, whereas, unlike previously, the second ends 2b and 3b are farther from the longitudinal axis 17 than the second ends 17b and 20b.

The elementary switch 1 and the elementary switch 101 operate in the following way.

Generally, in the absence of an electrical signal for activating the four ring resonators 9, 10, 13 and 14, the four rings 23, 24, 25 and 26 are in an "OFF" state (non-resonant state). A light wave entering through one of the ends of the four optical waveguides 2, 3, 17 and 20 comes out again through the other end thereof.

Also generally, in the presence of an electrical signal activating said integrated electronic components associated with one of the ring resonators 9, 10, 13 and 14, the corresponding ring is in an "ON" state (resonant state). The light wave entering through one end of one of the optical waveguides adjacent to this ring is redirected to the other optical waveguide adjacent to this ring, via this ring.

It is nevertheless accepted that in each optical waveguide, a wave may only flow in one direction and that, therefore, one end of an optical waveguide only constitutes either an input for receiving a light wave or an output for transmitting a light wave.

Consequently, the following configuration may be accepted, with a view to forming an elementary switch with four inputs and four outputs (4×4).

The ends 2b, 3b, 17a and 20a of the optical waveguides 2, 3, 17 and 20 constitute light wave inputs.

The ends 2a, 3a, 17b and 20b of the optical waveguides 2, 3, 17 and 20 constitute light wave outputs.

The inputs and outputs above are symbolized in the drawing by corresponding incoming and outgoing arrows.

When none of the ring resonators 9, 10, 13 and 14, is activated, light waves may be routed directly from the input end to the output end of the waveguides 2, 3, 17 and 20.

Figure 3:
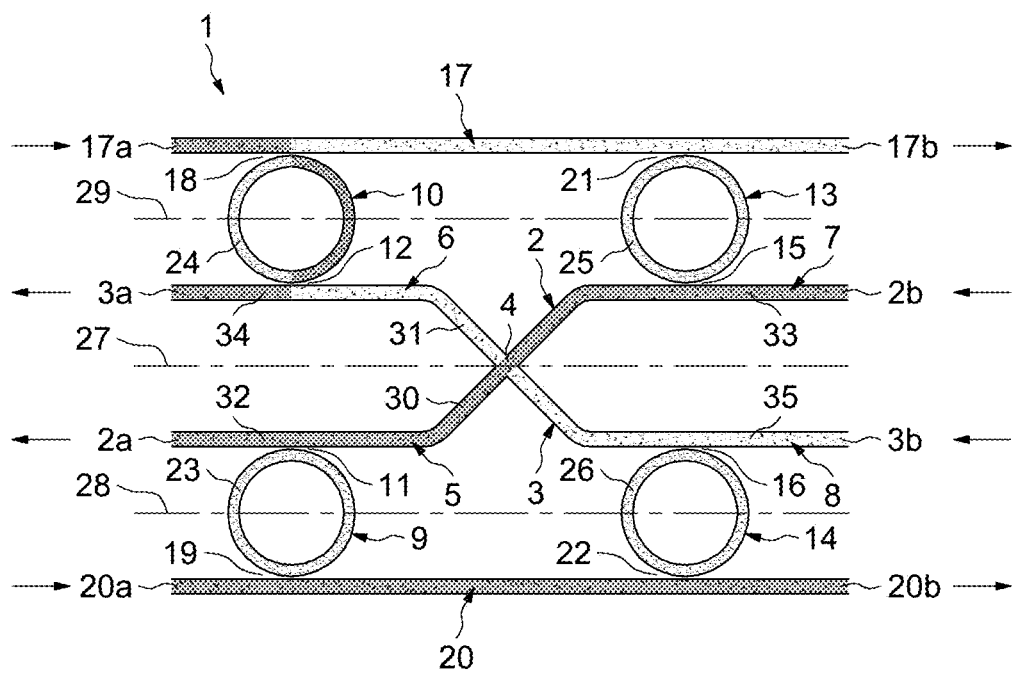
FIG. 3 represents flow modes of optical waves in the elementary switch in FIG. 1.

In a case of operation illustrated in FIG. 3 relating to the switch 1, if the ring resonator 10 is activated, a light wave entering through the end 17a of the optical waveguide 17 is diverted by this ring resonator 10 to the optical waveguide 3 and is routed to the output end 3a of this optical waveguide 3.

A light wave may be routed directly from the input end 2b of the optical waveguide 2 to the output end 2a of this optical waveguide 2.

On the other hand, if a light wave should enter through the input 3b of the optical waveguide 3, it could not be routed to the output 3a of this optical waveguide 3 since this output is already occupied by the diverted wave originating from the optical waveguide 17.

According to one alternative, a light wave may be routed directly from the input end 20a of the optical waveguide 20 to the output end 20b of this optical waveguide 20. On the other hand, if a light wave should enter through the input 3b of the optical waveguide 3, it could not be diverted by the ring resonator 14 to the optical waveguide 20 already thus occupied.

According to another alternative, a light wave entering through the input 3b of the optical waveguide 3 may be diverted by the ring resonator 14 to the optical waveguide 20 to be directed to the output 20b of the optical waveguide 20. On the other hand, if a light wave should enter through the input 20a of the optical waveguide 20, it could not be routed to the end 20b of the optical waveguide 20 already thus occupied. As a result, the elementary switch 1 is termed "blocking".

Other cases of operation may be developed by equivalence to the case described above by respectively activating the ring resonators 9, 13 and 14.

The cases above apply in an equivalent way to the elementary switch 101.

In the case where the ring resonators 9, 10, 13 and 14 are capable of resonating at a frequency $\lambda$, the elementary switches 1 and 101 are capable of directing or redirecting light waves established at this frequency.

The elementary switches 1 and 101 having been defined above, the base switches with four inputs and four outputs (4×4) will now be described, including pairs or couples of elementary switches connected "in series".

It is specified that the expression "in series" means that the waveguides of one elementary switch are selectively connected to the waveguides of the other elementary switch according to specific coupling modes. It is specified that the word "selectively" means that any one of the waveguides of one elementary switch may be connected to any one of the waveguides of the other elementary switch.

Figure 4:
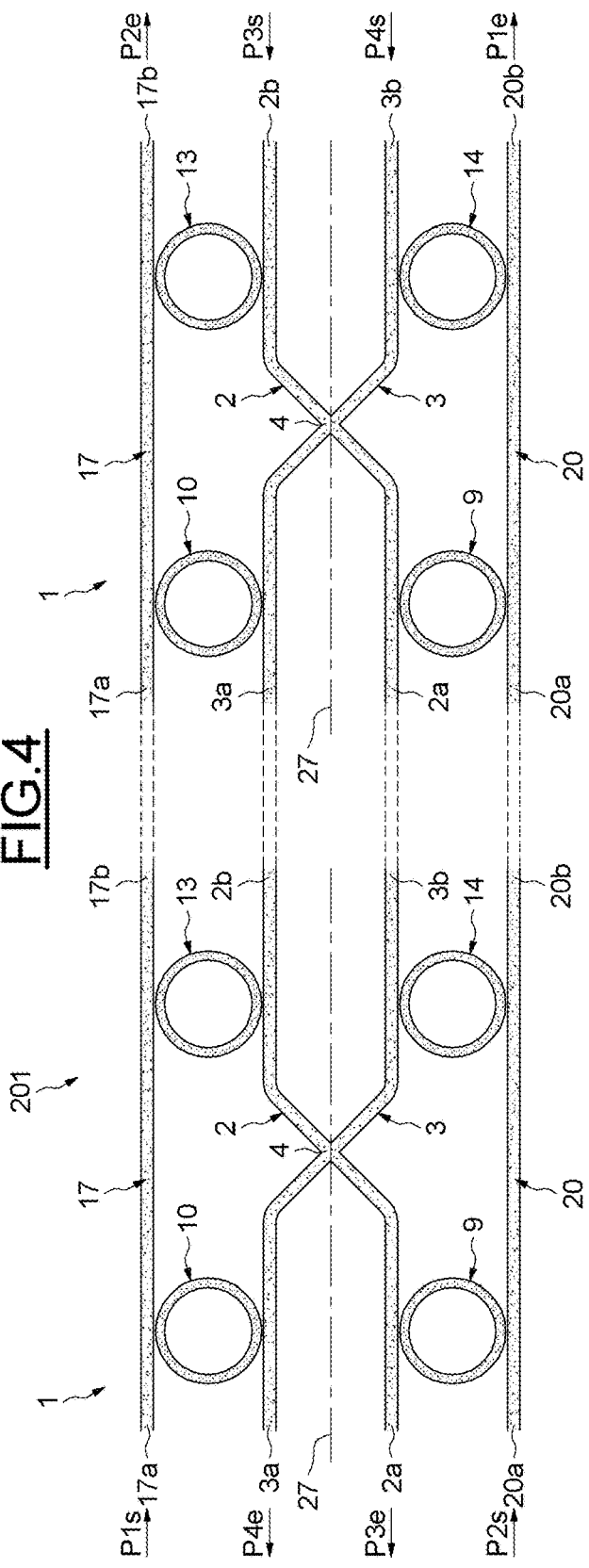
FIG. 4 represents a plan view of an integrated photonic interconnection base switch.

As illustrated in FIG. 4, a base switch 201 comprises first and second elementary switches 1 connected "in series", in a coupling mode such that the second ends 2b, 3b, 17b and 20b of the first elementary switch (on the left in FIG. 4) are connected to the first ends 2a, 3a, 17a and 20a of the second elementary switch (on the right in FIG. 4).

Thus, the first optical waveguides 2, the second optical waveguides 3, the third optical waveguides 17 and the fourth optical waveguides 20 of the two elementary switches 1 are respectively connected "in series".

Figure 5:
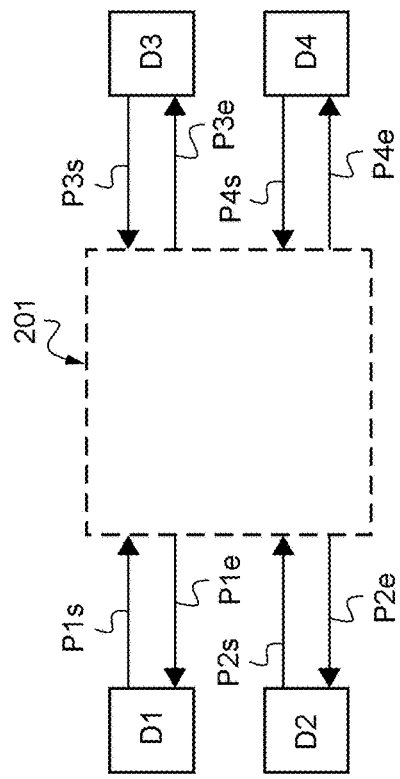
FIG. 5 represents a view of a photonic interconnection network.

FIG. 5 illustrates a photonic interconnection network integrated in an optoelectronic chip, which comprises optoelectronic devices D1, D2, D3 and D4 respectively having optical wave input ports P1e, P2e, P3e, and P4e and output ports P1s, P2s, P3s and P4s, which are selectively connected via the base switch 201.

For example, as illustrated in FIG. 4, on the one hand (on the left in FIG. 4) first, external, ends 2a, 3a, 17a and 20a, of the waveguides of the first elementary switch 1 are respectively connected to the ports P3e, P4e, P1s and P2s and on the other hand (on the right in FIG. 4) the second, external, ends 2b, 3b, 17b and 20b, of the waveguides of the second elementary switch 1 are respectively connected to the ports P3s, P4s, P2e and P1e.

It is considered as an operating condition that each of the devices D1 to D4 may, at a given instant, receive light waves originating only from one single device other than itself.

It is also considered as an operating condition that a light wave entering one of the elementary switches 1 may be diverted only for exiting this elementary switch 1.

Flow modes or optical paths described below as examples with reference to FIGS. 6A to 6D, may then be achieved by selectively activating the resonators 9, 10, 13 and 14 of the elementary switches 1 of the base switch 201.

As illustrated in FIG. 6A, the resonators 9, 10, 13 and 14 of the elementary switches 1 are not activated.

Then, light waves emerging from the output ports P1s, P2s are routed directly to the input ports P2e and P1e via the third and fourth waveguides 17 and 20, respectively "in series", of the elementary switches 1 and light waves emerging from the output ports P3s and P4s are routed directly to the input ports P4e and P3e via the first and second waveguides 2 and 3, respectively "in series", of the elementary switches 1.

As illustrated in FIG. 6B, the resonators 9 and 10 of the first elementary switch 1 and of the second elementary switch 1 are activated.

Then, a light wave emerging from the port P1s is diverted to the port P4e via the resonator 10 of the first switch 1, a light wave emerging from the port P2s is diverted to the port P3e via the resonator 9 of the first elementary switch 1, a light wave emerging from the port P3s is diverted to the port P1e via the resonator 9 of the second elementary switch 1, and a light wave emerging from the port P4s is diverted to the port P2e via the resonator 10 of the second elementary switch 1.

As illustrated in FIG. 6C, the resonator 14 of the first elementary switch 1 and the resonator 9 of the second elementary switch 1 are activated.

Then, a light wave emerging from the port P1s is directly routed to the port P2e, a light wave emerging from the port P4s is directly routed to the port P3e, a light wave emerging from the port P2s is diverted to the port P4e via the resonator 14 of the first elementary switch 1, and a light wave emerging from the port P3s is diverted to the port P1e via the resonator 9 of the second elementary switch 1.

Figure 6D:
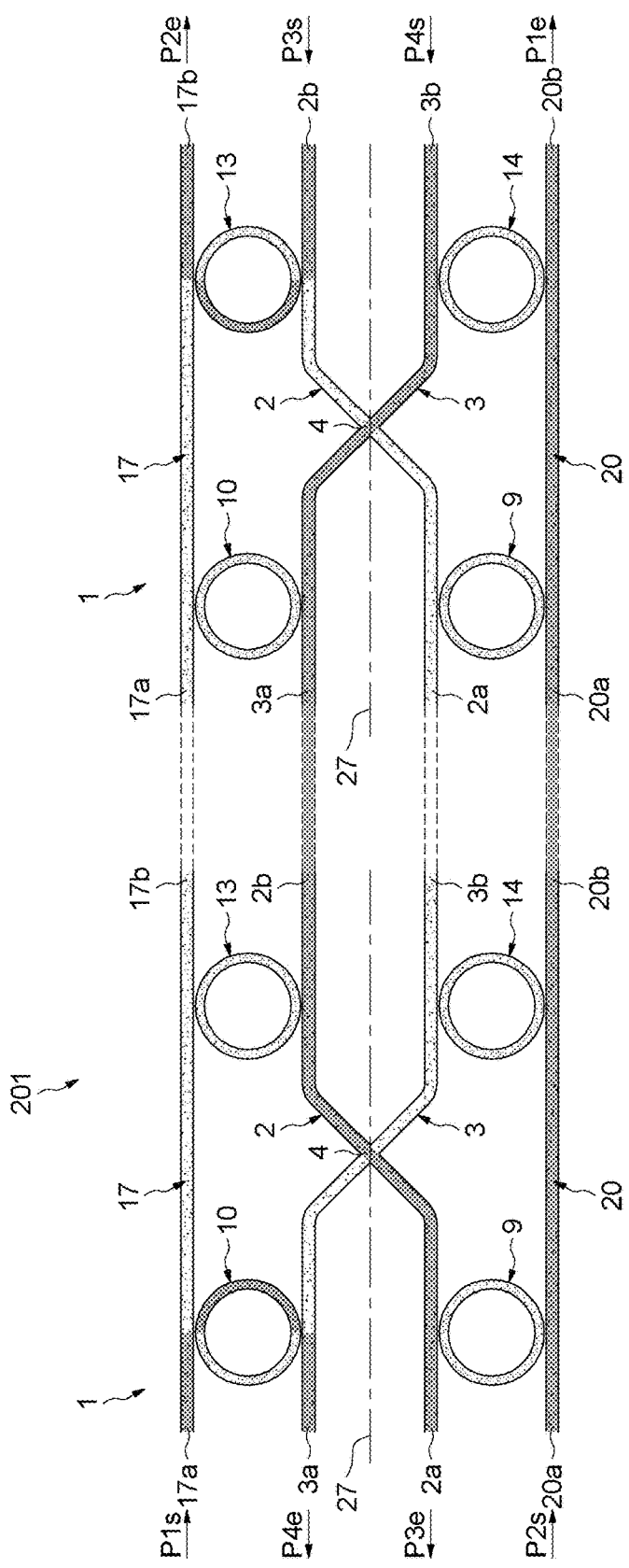

As illustrated in FIG. 6D, the resonator 10 of the first elementary switch 1 and the resonator 13 of the second elementary switch 1 are activated.

Then, a light wave emerging from the port P2s is directly routed to the port P1e, a light wave emerging from the port P4s is directly routed to the port P3e, a light wave emerging from the port P1s is diverted to the port P4e via the resonator 10 of the first elementary switch 1, and a light wave emerging from the port P3s is diverted to the port P2e via the resonator 13 of the second elementary switch 1.

Other flow modes or optical paths may be envisaged.

It follows from the foregoing that, the aforementioned conditions being respected, the devices D1 to D4 may, selectively, exchange optical waves via the base switch 201, without blocking since any device 101 to 104 may freely transmit information to any other device by simply respecting the fact that a device may receive (respectively transmit) only signals originating from (respectively directed towards) one single other device at a time. Thus the base switch 201 is termed "non-blocking".

In the case where the ring resonators of the elementary switches 1 are capable of resonating at a frequency λ, the base switch 201 is capable of directing or redirecting light waves established at this frequency.

Figure 7:
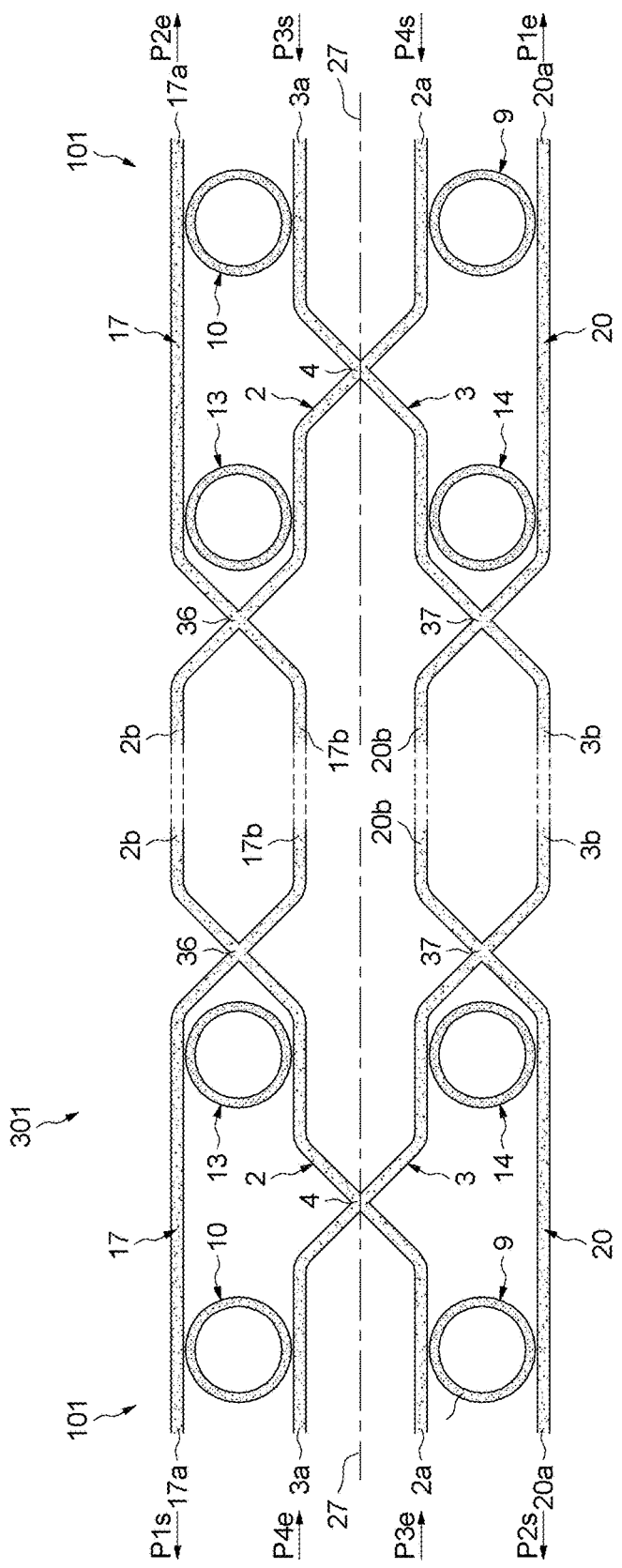
FIG. 7 represents a plan view of another integrated photonic interconnection base switch.

As illustrated in FIG. 7, a base switch 301 comprises two elementary switches 101 connected "in series", head-to-tail, in a coupling mode such that the second ends 2b, 3b, 17b and 20b of one of the elementary switches 101 are connected to the second ends 2b, 3b, 17b and 20b of the other elementary switch 101.

Thus, the first optical waveguides 2, the second optical waveguides 3, the third optical waveguides 17 and the fourth optical waveguides 20 of the two elementary switches 101 are respectively connected "in series", constituting a base switch with four inputs and four outputs (4×4).

In fact, the base switch 301 differs from the base switch 201 only by the existence of the intersections 36 and 37.

Flow modes or optical paths previously described as examples with reference to FIGS. 6A to 6D are directly applicable to the base switch 301.

In the case where the ring resonators of the elementary switches 101 are capable of resonating at a frequency λ, the base switch 301 is capable of directing or redirecting light waves established at this frequency.

Figure 8:
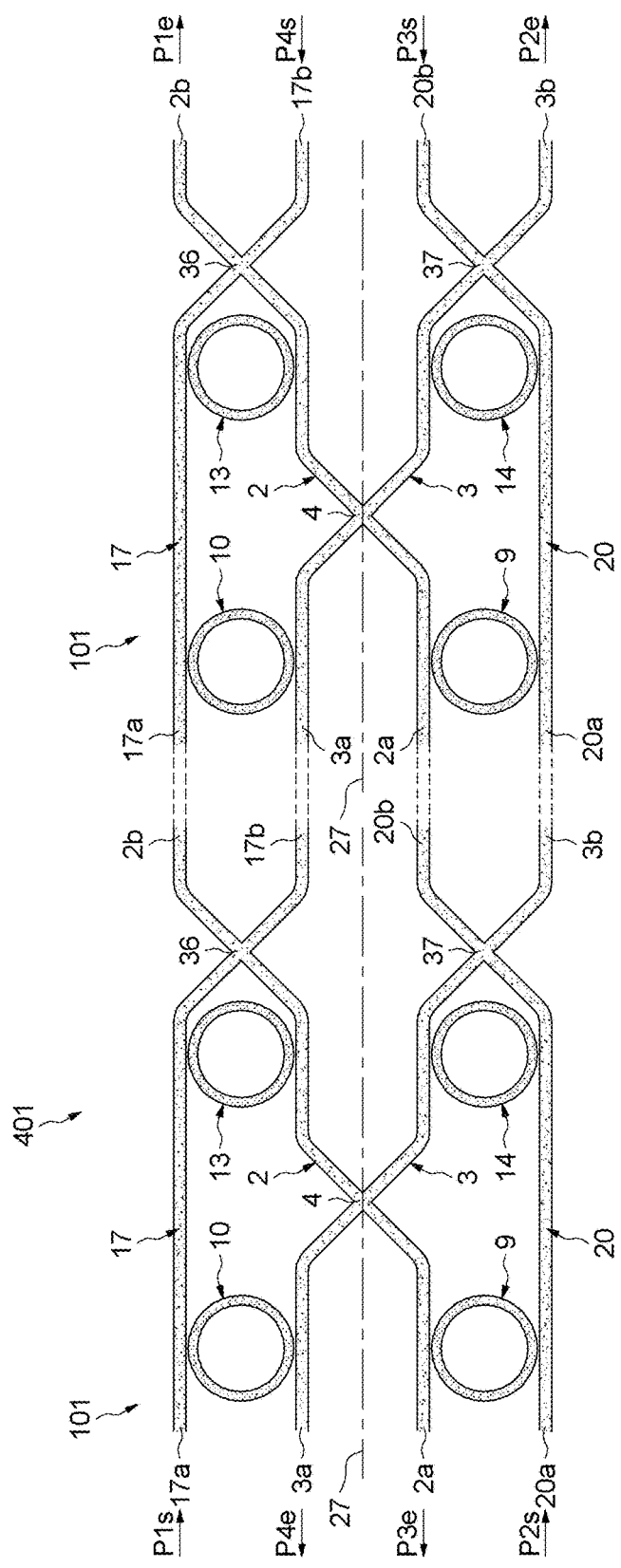
FIG. 8 represents a plan view of another integrated photonic interconnection base switch.

As illustrated in FIG. 8, a base switch 401 comprises two elementary switches 101 connected "in series", in a coupling mode such that the second ends 2b, 3b, 17b and 20b of the optical waveguides 2, 3, 17 and 20 of one of the elementary switches are connected to the first ends 2b, 3b, 17b and 20b of the optical waveguides 2, 3, 17, 20 of the other elementary switch.

Thus, the first, second, third and fourth optical waveguides 2, 3, 17 and 20 of one of the elementary switches 101 are respectively connected to the third, fourth, second and first optical waveguides 17, 20, 3 and 2 of the other elementary switch 101.

For example, on the one hand (on the left in FIG. 8) first, external, ends 2a, 3a, 17a and 20a, of the waveguides of the first elementary switch 101 are respectively connected to the ports P3e, P4e, P1s and P2s and on the other hand (on the right in FIG. 8) the second, external, ends 2b, 3b, 17b and 20b, of the waveguides of the second elementary switch 101 are respectively connected to the ports P1e, P2e, P4s and P3s.

Operating conditions equivalent to those previously mentioned being respected, flow modes or optical paths may be achieved by selectively activating the resonators 9, 10, 13 and 14 of the two elementary switches 101 of the base switch 401, so that the devices D1 to D4 may, selectively, exchange light waves via the base switch 401, without blocking. The base switch 401 is also "non-blocking".

In the case where the ring resonators of the elementary switches 101 are capable of resonating at a frequency λ, the base switch 401 is capable of directing or redirecting light waves established at this frequency.

Figure 9:
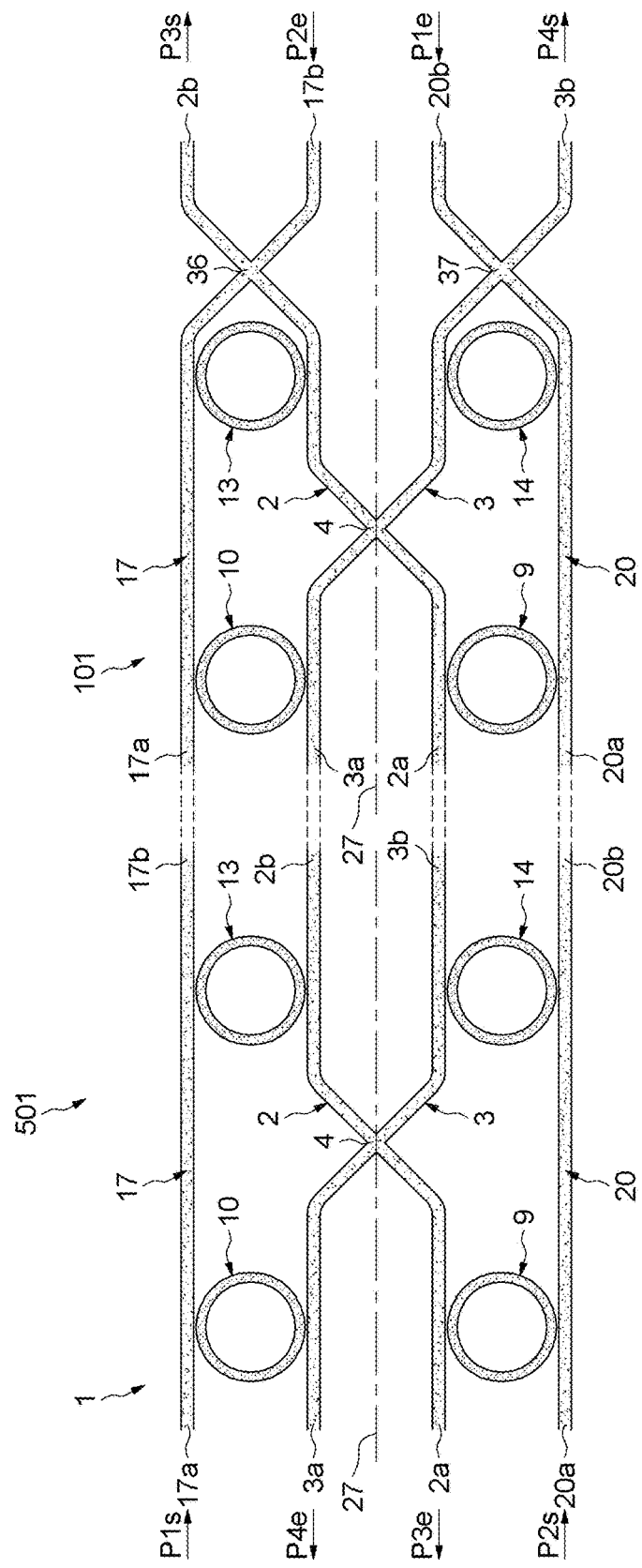
FIG. 9 represents a plan view of another integrated photonic interconnection base switch.

As illustrated in FIG. 9, a base switch 501 comprises two elementary switches, namely an elementary switch 1 (on the left in FIG. 9) and an elementary switch 101 (on the right in FIG. 9), connected "in series", in a coupling mode such that the second ends 2b, 3b, 17b and 20b of the optical waveguides 2, 3, 17 and 20 of the elementary switch 1 are respectively connected to the first ends 3a, 2a, 17a and 20a of the optical waveguides 3, 2, 17 and 20 of the elementary switch 101.

Thus, the first, second, third and fourth optical waveguides 2, 3, 17 and 20 of the elementary switch 101 are "in series" with the second, first, third and fourth optical waveguides of the elementary switch 1.

For example, on the one hand (on the left in FIG. 9) first, external, ends 2a, 3a, 17a and 20a, of the waveguides of the first elementary switch 1 are respectively connected to the ports P3e, P4e, P1s and P2s and on the other hand (on the right in FIG. 9) the second, external, ends 2b, 3b, 17b and 20b, of the waveguides of the second elementary switch 101 are respectively connected to the ports P3s, P4s, P2e and P1e.

Operating conditions equivalent to those previously mentioned being respected, flow modes or optical paths may be achieved by selectively activating the resonators 9, 10, 13 and 14 of the two elementary switches 1 and 101 of the base switch 501, so that the devices D1 to D4 may, selectively, exchange light waves via the base switch 501, without blocking. The base switch 501 is also "non-blocking".

In the case where the ring resonators of the elementary switches 1 and 101 are capable of resonating at a frequency λ, the base switch 501 is capable of directing or redirecting light waves established at this frequency.

Figure 10:
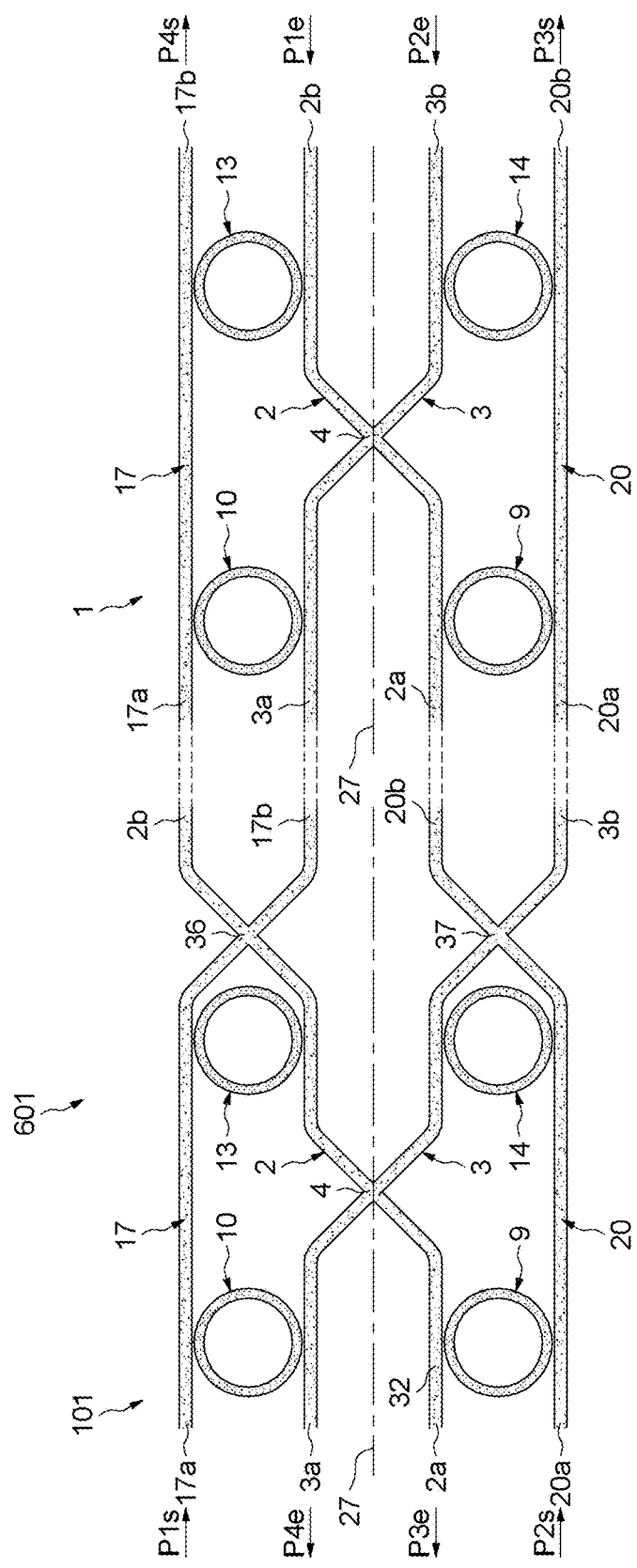
FIG. 10 represents a plan view of another integrated photonic interconnection base switch.

As illustrated in FIG. 10, a base switch 601 comprises two elementary switches, namely an elementary switch 1 (on the right in FIG. 10) and an elementary switch 101 (on the left in FIG. 10), connected "in series", but in a coupling mode such that the second ends 2b, 3b, 17b and 20b of the first, second, third and fourth optical waveguides 2, 3, 17 and 20 of the elementary switch 1 are respectively connected to the first ends 17a, 20a, 3a and 2a of the elementary switch 101.

Thus, the first, second, third and fourth optical waveguides 2, 3, 17 and 20 of the elementary switch 1 are connected "in series" with the first, third, fourth and second optical waveguides 17, 20, 3 and 2 of the elementary switch 101.

For example, on the one hand (on the left in FIG. 10) first, external, ends 2a, 3a, 17a and 20a, of the waveguides of the elementary switch 101 are respectively connected to the ports P3e, P4e, P1s and P2s and on the other hand (on the right in FIG. 10) the second, external, ends 2b, 3b, 17b and 20b, of the waveguides of the second elementary switch 101 are respectively connected to the ports P1e, P2e, P4s and P3s.

Operating conditions equivalent to those previously mentioned being respected, flow modes or optical paths may be achieved by selectively activating the resonators 9, 10, 13 and 14 of the two elementary switches 1 and 101 of the base switch 601, so that the devices D1 to D4 may, selectively, exchange light waves via the base switch 601, without blocking. The base switch 601 is also "non-blocking".

In the case where the ring resonators are capable of resonating at a frequency λ, the base switch 601 is capable of directing or redirecting light waves established at this frequency.

Having defined base switches above, complex switches will now be described including base switches formed of pairs or couples of elementary switches.

Figure 11:
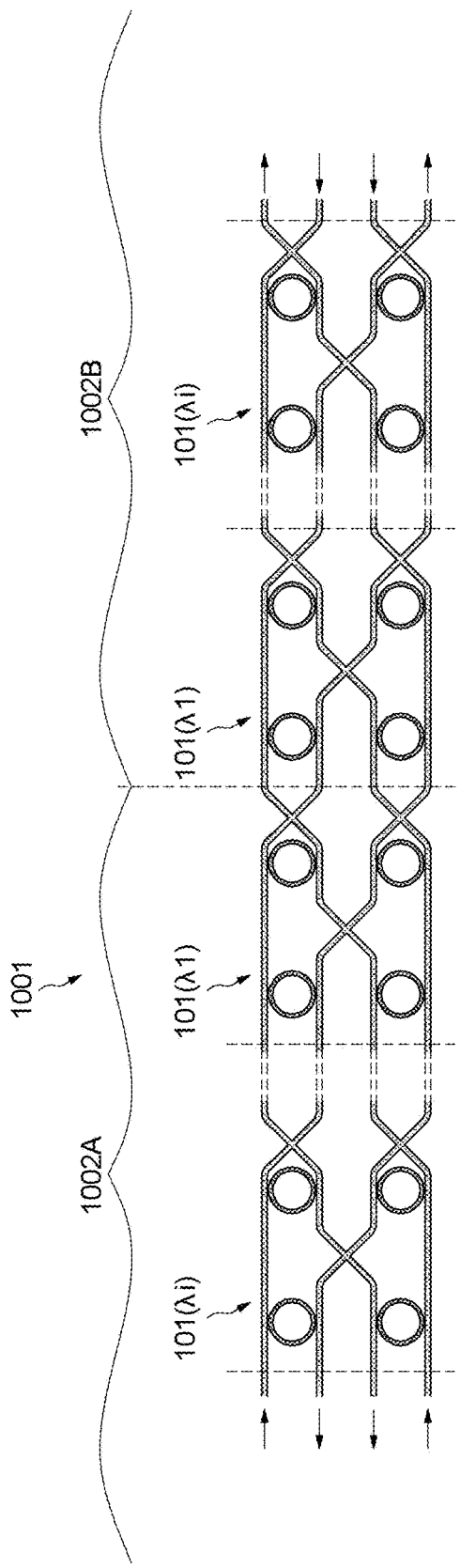
FIG. 11 represents a plan view of an integrated photonic interconnection complex switch.

As illustrated in FIG. 11, a complex switch 1001, with four inputs and four outputs (4×4) which can be respectively connected to the devices D1 to D4, comprises an even number of elementary switches 101, such as described with reference to FIG. 1, which are connected "in series", one after another as previously described with reference to FIG. 8.

The elementary switches 101 are assembled, for example, in two groups 1002A and 1002B "in series" which each include elementary switches 101, specifically identified, in each group, by the references 101(λ1) ... 101(λi) ..., the elementary switches 101(λ1) being adjacent. Each group may comprise an even or odd number of elementary switches 101.

Thus, each group may comprise, "in series", one elementary switch 101(λ1) and one elementary switch 101(λi), one elementary switch 101(λ1) and two elementary switches 101(λi) and 101(λk), one elementary switch 101(λ1) and three elementary switches 101(λi), 101(λk) and 101(λ,1) and so on.

Advantageously, the elementary switches 101(λ1), 101(λi) are respectively such that their respective resonators 9, 10, 13 and 14 are capable of diverting light waves respectively having different frequencies λ1, λi.

Thus, each pair of elementary switches 101(λ1), 101(λi), one of which is from the group 1002A and the other from the group 2002B, behaves in an equivalent way specifically to the pairs of elementary switches 101 of the base switch 401 previously described with reference to FIG. 8.

Given that each pair of elementary switches 101(λ1), 101(λi), is "non-blocking", the complex switch 1001 is "non-blocking".

Thus, incoming light waves including frequencies λ1, λi are directed or redirected respectively by the base switches respectively constituted by the pairs of elementary switches 101(λ1) and 101(λi).

The light wave at the frequency λ1 is directed or redirected by the pair of elementary switches 101(λ1) and passes through the other elementary switches without being redirected. The light wave at the frequency λi is directed or redirected by the pair of elementary switches 101(λi) and passes through the other elementary switches without being redirected.

It follows from the foregoing that in the case where light waves comprising two frequencies should be redirected, the complex switch 1001 comprises four elementary switches 101 forming two pairs of base switches 401 respectively allocated to the two frequencies.

In the case where light waves comprising three frequencies should be redirected, the complex switch 1001 comprises six elementary switches 101 forming three pairs of base switches 401 respectively allocated to the three frequencies.

More generally, in the case where light waves comprising m frequencies should be redirected, the complex switch 1001 comprises twice m elementary switches 101 forming m pairs of base switches 401 respectively allocated to the m frequencies.

According to variant embodiments, the elementary switches 101 forming the complex switch 1001, respectively allocated in pairs to light waves of frequencies λ1 and λi could be interlinked in different ways.

Figure 12:
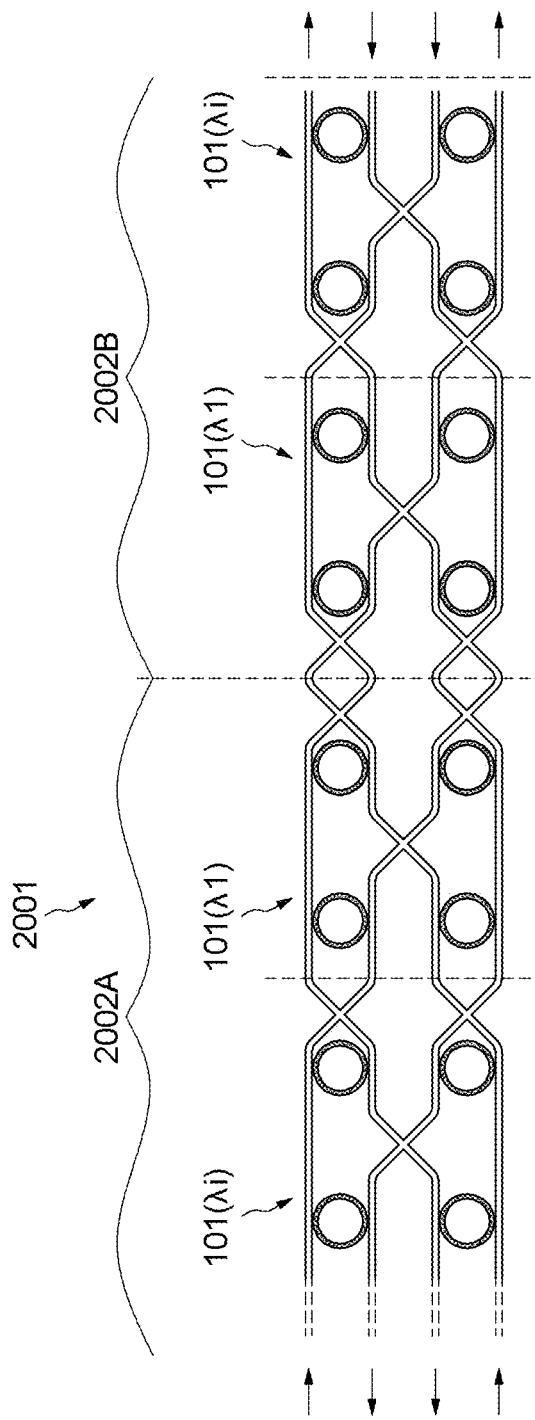
FIG. 12 represents a plan view of another integrated photonic interconnection complex switch.

As illustrated in FIG. 12, a complex switch 2001, with four inputs and four outputs (4×4) which can be respectively connected to the devices D1 to D4, comprises an even number of elementary switches connected "in series", e.g. according to a following configuration.

The elementary switches are assembled, for example, in two groups 2002A and 2002B "in series". Each group may comprise an even or odd number of elementary switches.

More specifically, each group 2002A comprises at least two elementary switches 101 connected "in series" in accordance with the base switch 401 previously described with reference to FIG. 8.

The elementary switches 101 of the group 2002A and those of the group 2002B are arranged head-to-tail so that the adjacent elementary switches 101, one of which is from the group 2002A and the other from the group 2002B, are connected in accordance with the base switch 301 described with reference to FIG. 7. Nevertheless, according to a variant embodiment, the elementary switches 101 could be connected in accordance with the base switch 201 described with reference to FIG. 4.

Advantageously, the elementary switches 101, of the group 2002A and those of the group 2002B are respectively such that their respective resonators 9, 10, 13 and 14 are capable of diverting light waves respectively having different frequencies.

Pairs or couples of elementary switches are thus constituted, forming base switches, respectively subjected to the different frequencies λ1, λi.

In an equivalent way to the example described with reference to FIG. 11, each pair or couple of elementary switches, constituting a base switch, is capable of directing and redirecting optical waves established at the frequency allocated thereto, while these optical waves pass through the other elementary switches directly.

According to a variant embodiment, the elementary switches 101 of the group 2002A and those of the group 2002B could be connected in reverse.

The base switches and the complex switches have been described and represented in the figures by placing the elementary switches in line. Nevertheless, for the needs of chip layout, the elementary switches could be non-aligned so as to form coils, for example.

As is apparent from the foregoing, the described base switches and the described complex switches are non-blocking, while they contain very simple elementary but blocking switches. Thanks to this, the number of intersections of the optical waveguides and the number of resonators are reduced so that the losses and crosstalk are reduced.

The invention claimed is:

1. A photonic interconnection elementary switch integrated in an optoelectronic chip, comprising:
a first linear optical waveguide and a second linear optical waveguide which intersect forming a first intersection and which each respectively have first and second external optical coupling ends, so that the first linear optical waveguide and the second linear waveguide each have first branches between said intersection and said first ends and each have second branches between said first intersection and said second ends;
two first photonic redirect ring resonators, respectively comprising a single ring, respectively coupled to the first linear optical waveguide and second optical waveguide in local optical coupling areas of the first branches, wherein the first branches pass between the two first photonic redirect ring resonators,
two second photonic redirect ring resonators, respectively comprising a single ring, respectively coupled to the first linear optical waveguide and second optical waveguide in local optical coupling areas of the second branches, wherein the second branches pass between the two second photonic redirect ring resonators,
a third linear optical waveguide coupled in local optical coupling areas to one of the two first photonic redirect ring resonators and to one of the two second photonic redirect ring resonators which are located on a same side with respect to the first branch of the second optical waveguide and the second branch of the first optical waveguide, and
a fourth linear optical waveguide coupled in local optical coupling areas to another of the two first photonic redirect ring resonators and to another of the two second photonic redirect ring resonators located on a same side with respect to the first branch of the first optical waveguide and the second branch of the second optical waveguide;
wherein the third linear optical waveguide and the fourth optical waveguide each have first ends on the side of the two first photonic redirect ring resonators and second ends on the side of the two second photonic redirect ring resonators.

2. The elementary switch according to claim 1, wherein the third optical waveguide does not intersect either of the first, second and fourth optical waveguides and wherein the fourth optical waveguide does not intersect any of the first, second and third optical waveguides.

3. The elementary switch according to claim 1, wherein the first optical waveguide intersects the third optical waveguide and wherein the second optical waveguide intersects the fourth optical waveguide, respectively between their second ends and the second ring resonators, to form second and third intersections.

4. The elementary switch according to claim 1, further comprising an axis of symmetry that said first intersection is located on at a position between said first and second optical waveguides, and wherein on each side of the axis of symmetry said first and second ring resonators are respectively located.

5. The elementary switch according to claim 1, wherein the first ends of the third and fourth optical waveguides and the second ends of the first and second optical waveguides form light wave inputs, and wherein the first ends of the first and second optical waveguides and the second ends of the third and fourth optical waveguides form light wave outputs.

6. The elementary switch according to claim 1, wherein the first ends of the third and fourth optical waveguides and the second ends of the first and second optical waveguides form light wave outputs, and wherein the first ends of the first and second optical waveguides and the second ends of the third and fourth optical waveguides form light wave inputs.

7. A photonic interconnection base switch integrated in an optoelectronic chip, comprising:
a first elementary switch and a second elementary switch, wherein each of the first and second elementary switches comprises:
a first linear optical waveguide and a second linear optical waveguide which intersect forming a first intersection and which each respectively have first and second external optical coupling ends, so that the first linear optical waveguide and the second linear waveguide each have first branches between said intersection and said first ends and each have second branches between said first intersection and said second ends;
two first photonic redirect ring resonators, respectively comprising a single ring, respectively coupled to the first linear optical waveguide and second optical waveguide in local optical coupling areas of the first branches, wherein the first branches pass between the two first photonic redirect ring resonators,
two second photonic redirect ring resonators, respectively comprising a single ring, respectively coupled to the first linear optical waveguide and second optical waveguide in local optical coupling areas of the second branches, wherein the second branches pass between the two second photonic redirect ring resonators,
a third linear optical waveguide coupled in local optical coupling areas to one of the two first photonic redirect ring resonators and to one of the two second photonic redirect ring resonators which are located on a same side with respect to the first branch of the second optical waveguide and the second branch of the first optical waveguide, and a fourth linear optical waveguide coupled in local optical coupling areas to another of the two first photonic redirect ring resonators and to another of the two second photonic redirect ring resonators located on a same side with respect to the first branch of the first optical waveguide and the second branch of the second optical waveguide;

wherein the third linear optical waveguide and the fourth optical waveguide each have first ends on the side of the two first photonic redirect ring resonators and second ends on the side of the two second photonic redirect ring resonators; and wherein the linear optical waveguides of the first elementary switch are connected to the linear optical waveguides of the second elementary switch.

8. The photonic interconnection base switch according to claim 7, wherein the photonic redirect ring resonators of said first and second elementary switches are configured to resonate at a same frequency.

9. A photonic interconnection complex switch integrated in an optoelectronic chip, comprising:

an even number of elementary switches;

wherein each elementary switch comprises:

a first linear optical waveguide and a second linear optical waveguide which intersect forming a first intersection and which each respectively have first and second external optical coupling ends, so that the first linear optical waveguide and the second linear waveguide each have first branches between said intersection and said first ends and each have second branches between said first intersection and said second ends;

two first photonic redirect ring resonators, respectively comprising a single ring, respectively coupled to the first linear optical waveguide and second optical waveguide in local optical coupling areas of the first branches, wherein the first branches pass between the two first photonic redirect ring resonators, two second photonic redirect ring resonators, respectively comprising a single ring, respectively coupled to the first linear optical waveguide and second optical waveguide in local optical coupling areas of the second branches, wherein the second branches pass between the two second photonic redirect ring resonators, a third linear optical waveguide coupled in local optical coupling areas to one of the two first photonic redirect ring resonators and to one of the two second photonic redirect ring resonators which are located on a same side with respect to the first branch of the second optical waveguide and the second branch of the first optical waveguide, and a fourth linear optical waveguide coupled in local optical coupling areas to another of the two first photonic redirect ring resonators and to another of the two second photonic redirect ring resonators located on a same side with respect to the first branch of the first optical waveguide and the second branch of the second optical waveguide;

wherein the third linear optical waveguide and the fourth optical waveguide each have first ends on the side of the two first photonic redirect ring resonators and second ends on the side of the two second photonic redirect ring resonators; and wherein the linear optical waveguides adjacent ones of the elementary switches are selectively connected in series; and wherein photonic redirect ring resonators of the elementary switches are subjected in pairs to different frequencies.

10. A photonic interconnection complex switch integrated in an optoelectronic chip, comprising:

a plurality of base switches;

wherein each base switch comprises:

a first elementary switch and a second elementary switch, wherein each of the first and second elementary switches comprises:

a first linear optical waveguide and a second linear optical waveguide which intersect forming a first intersection and which each respectively have first and second external optical coupling ends, so that the first linear optical waveguide and the second linear waveguide each have first branches between said intersection and said first ends and each have second branches between said first intersection and said second ends;

two first photonic redirect ring resonators, respectively comprising a single ring, respectively coupled to the first linear optical waveguide and second optical waveguide in local optical coupling areas of the first branches, wherein the first branches pass between the two first photonic redirect ring resonators, two second photonic redirect ring resonators, respectively comprising a single ring, respectively coupled to the first linear optical waveguide and second optical waveguide in local optical coupling areas of the second branches, wherein the second branches pass between the two second photonic redirect ring resonators, a third linear optical waveguide coupled in local optical coupling areas to one of the two first photonic redirect ring resonators and to one of the two second photonic redirect ring resonators which are located on a same side with respect to the first branch of the second optical waveguide and the second branch of the first optical waveguide, and a fourth linear optical waveguide coupled in local optical coupling areas to another of the two first photonic redirect ring resonators and to another of the two second photonic redirect ring resonators located on a same side with respect to the first branch of the first optical waveguide and the second branch of the second optical waveguide;

wherein the third linear optical waveguide and the fourth optical waveguide each have first ends on the side of the two first photonic redirect ring resonators and second ends on the side of the two second photonic redirect ring resonators; and wherein the linear optical waveguides of the first elementary switch are connected to the linear optical waveguides of the second elementary switch; and wherein the linear optical waveguides of the adjacent elementary switches are selectively connected in series; and wherein photonic redirect ring resonators of the base switches are subjected to different frequencies.

11. A photonic interconnection network integrated in an optoelectronic chip, comprising:

a plurality of optoelectronic devices having waveguide input ports and output ports; and a base switch for interconnecting the waveguide input ports and output ports;

wherein the base switch comprises:
a first elementary switch and a second elementary switch, wherein each of the first and second elementary switches comprises:
a first linear optical waveguide and a second linear optical waveguide which intersect forming a first intersection and which each respectively have first and second external optical coupling ends, so that the first linear optical waveguide and the second linear waveguide each have first branches between said intersection and said first ends and each have second branches between said first intersection and said second ends;
two first photonic redirect ring resonators, respectively comprising a single ring, respectively coupled to the first linear optical waveguide and second optical waveguide in local optical coupling areas of the first branches, wherein the first branches pass between the two first photonic redirect ring resonators,
two second photonic redirect ring resonators, respectively comprising a single ring, respectively coupled to the first linear optical waveguide and second optical waveguide in local optical coupling areas of the second branches, wherein the second branches pass between the two second photonic redirect ring resonators,
a third linear optical waveguide coupled in local optical coupling areas to one of the two first photonic redirect ring resonators and to one of the two second photonic redirect ring resonators which are located on a same side with respect to the first branch of the second optical waveguide and the second branch of the first optical waveguide, and
a fourth linear optical waveguide coupled in local optical coupling areas to another of the two first photonic redirect ring resonators and to another of the two second photonic redirect ring resonators located on a same side with respect to the first branch of the first optical waveguide and the second branch of the second optical waveguide;
wherein the third linear optical waveguide and the fourth optical waveguide each have first ends on the side of the two first photonic redirect ring resonators and second ends on the side of the two second photonic redirect ring resonators; and
wherein the linear optical waveguides of the first elementary switch are connected to the linear optical waveguides of the second elementary switch.

12. A photonic interconnection network integrated in an optoelectronic chip, comprising:
a plurality of optoelectronic devices having waveguide input ports and output ports; and
a complex switch for interconnecting the waveguide input ports and output ports;
wherein the complex switch comprises:
an even number of elementary switches;
wherein each elementary switch comprises:
a first linear optical waveguide and a second linear optical waveguide which intersect forming a first intersection and which each respectively have first and second external optical coupling ends, so that the first linear optical waveguide and the second linear waveguide each have first branches between said intersection and said first ends and each have second branches between said first intersection and said second ends;
two first photonic redirect ring resonators, respectively comprising a single ring, respectively coupled to the first linear optical waveguide and second optical waveguide in local optical coupling areas of the first branches, wherein the first branches pass between the two first photonic redirect ring resonators,
two second photonic redirect ring resonators, respectively comprising a single ring, respectively coupled to the first linear optical waveguide and second optical waveguide in local optical coupling areas of the second branches, wherein the second branches pass between the two second photonic redirect ring resonators,
a third linear optical waveguide coupled in local optical coupling areas to one of the two first photonic redirect ring resonators and to one of the two second photonic redirect ring resonators which are located on a same side with respect to the first branch of the second optical waveguide and the second branch of the first optical waveguide, and
a fourth linear optical waveguide coupled in local optical coupling areas to another of the two first photonic redirect ring resonators and to another of the two second photonic redirect ring resonators located on a same side with respect to the first branch of the first optical waveguide and the second branch of the second optical waveguide;
wherein the third linear optical waveguide and the fourth optical waveguide each have first ends on the side of the two first photonic redirect ring resonators and second ends on the side of the two second photonic redirect ring resonators; and
wherein the linear optical waveguides adjacent ones of the elementary switches are selectively connected in series; and
wherein photonic redirect ring resonators of the elementary switches are subjected in pairs to different frequencies.

\* \* \* \* \*